US012280600B2

(12) United States Patent
Fukasawa

(10) Patent No.: US 12,280,600 B2
(45) Date of Patent: Apr. 22, 2025

(54) METHOD FOR MANUFACTURING REFILLED INK CONTAINER

(71) Applicant: SEIKO EPSON CORPORATION, Tokyo (JP)

(72) Inventor: Noriyuki Fukasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 196 days.

(21) Appl. No.: 18/180,909

(22) Filed: Mar. 9, 2023

(65) Prior Publication Data

US 2023/0286279 A1 Sep. 14, 2023

(30) Foreign Application Priority Data

Mar. 10, 2022 (JP) ................................. 2022-036896

(51) Int. Cl.
*B41J 2/175* (2006.01)

(52) U.S. Cl.
CPC ....... *B41J 2/17506* (2013.01); *B41J 2/17513* (2013.01); *B41J 2/17523* (2013.01)

(58) Field of Classification Search
CPC ................ B41J 2/17506; B41J 2/17513; B41J 2/17523; B41J 2/17559
See application file for complete search history.

(56) References Cited

U.S. PATENT DOCUMENTS

2013/0242009 A1 9/2013 Bannai et al.

FOREIGN PATENT DOCUMENTS

JP 2011251411 A * 12/2011
JP 2013-216083 A 10/2013

OTHER PUBLICATIONS

Sakauchi Akiko et al., “Cleaning Method of Liquid Ejecting Device and Ink Cartridge, Ink Cartridge, and Refilled Ink Cartridge” (JP 2011251411 A), Dec. 15, 2011, [Description of Embodiments: Ink cartridge cleaning, Refilling Ink, and Discharge stability of refilled ink cartridges (Year: 2011).*

* cited by examiner

*Primary Examiner* — Lisa Solomon
(74) *Attorney, Agent, or Firm* — Oliff PLC

(57) ABSTRACT

A method for manufacturing a refilled ink container includes: a first step of pouring a cleaning solution into a used ink container including a liquid flowing portion and a liquid accommodating portion through the liquid flowing portion to fill the liquid accommodating portion with the cleaning solution, the liquid flowing portion being configured to supply and discharge liquid; a second step of discharging the cleaning solution in the liquid accommodating portion through the liquid flowing portion together with a residue remaining in the liquid accommodating portion; and a third step of, after the second step, pouring refill ink into the ink container through the liquid flowing portion to fill the liquid accommodating portion with the refill ink.

2 Claims, 6 Drawing Sheets

METHOD FOR MANUFACTURING REFILLED INK CONTAINER

The present application is based on, and claims priority from JP Application Serial Number 2022-036896, filed Mar. 10, 2022, the disclosure of which is hereby incorporated by reference herein in its entirety.

BACKGROUND

1. Technical Field

The present disclosure relates to a method for manufacturing a refilled ink container.

2. Related Art

JP-A-2013-216083 discloses a refilled ink cartridge obtained by filling a used ink cartridge with refill pigment ink having a pH higher than that of pigment ink remaining in the used ink cartridge, and a method for manufacturing the refilled ink cartridge.

Since the amount of ink remaining in a used ink container and the pH of the ink vary depending on the individual used ink container, the quality of ink after refilling may vary depending on the individual ink container and may thus be unstable. In addition, since there is a possibility that a residue such as an aggregate of a colorant contained in ink remains inside a used ink container, the use of a refilled ink container obtained by refilling a used ink cartridge with ink may cause problems such as clogging of a filter due to a residue in a liquid consuming device. Therefore, there has been a demand for a technology that can improve the quality of ink accommodated in a refilled ink container.

SUMMARY

According to an aspect of the present disclosure, a method for manufacturing a refilled ink container is provided. The method for manufacturing a refilled ink container includes: a first step of pouring a cleaning solution into a used ink container including a liquid flowing portion and a liquid accommodating portion through the liquid flowing portion to fill the liquid accommodating portion with the cleaning solution, the liquid flowing portion being configured to supply and discharge liquid; a second step of discharging the cleaning solution in the liquid accommodating portion through the liquid flowing portion together with a residue remaining in the liquid accommodating portion; and a third step of, after the second step, pouring refill ink into the ink container through the liquid flowing portion to fill the liquid accommodating portion with the refill ink.

DESCRIPTION OF EXEMPLARY EMBODIMENTS

A. First Embodiment

Figure 1:
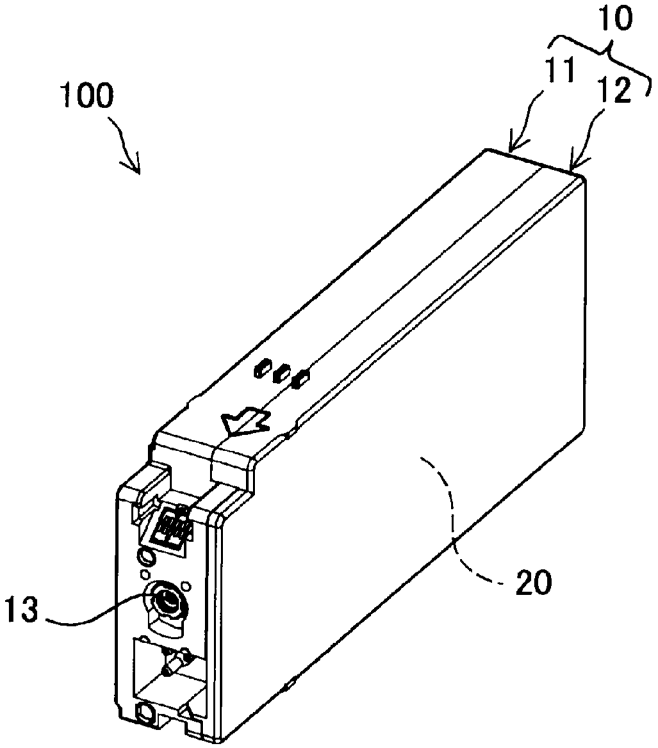
FIG. 1 is an external perspective view of an ink container.
Figure 2:
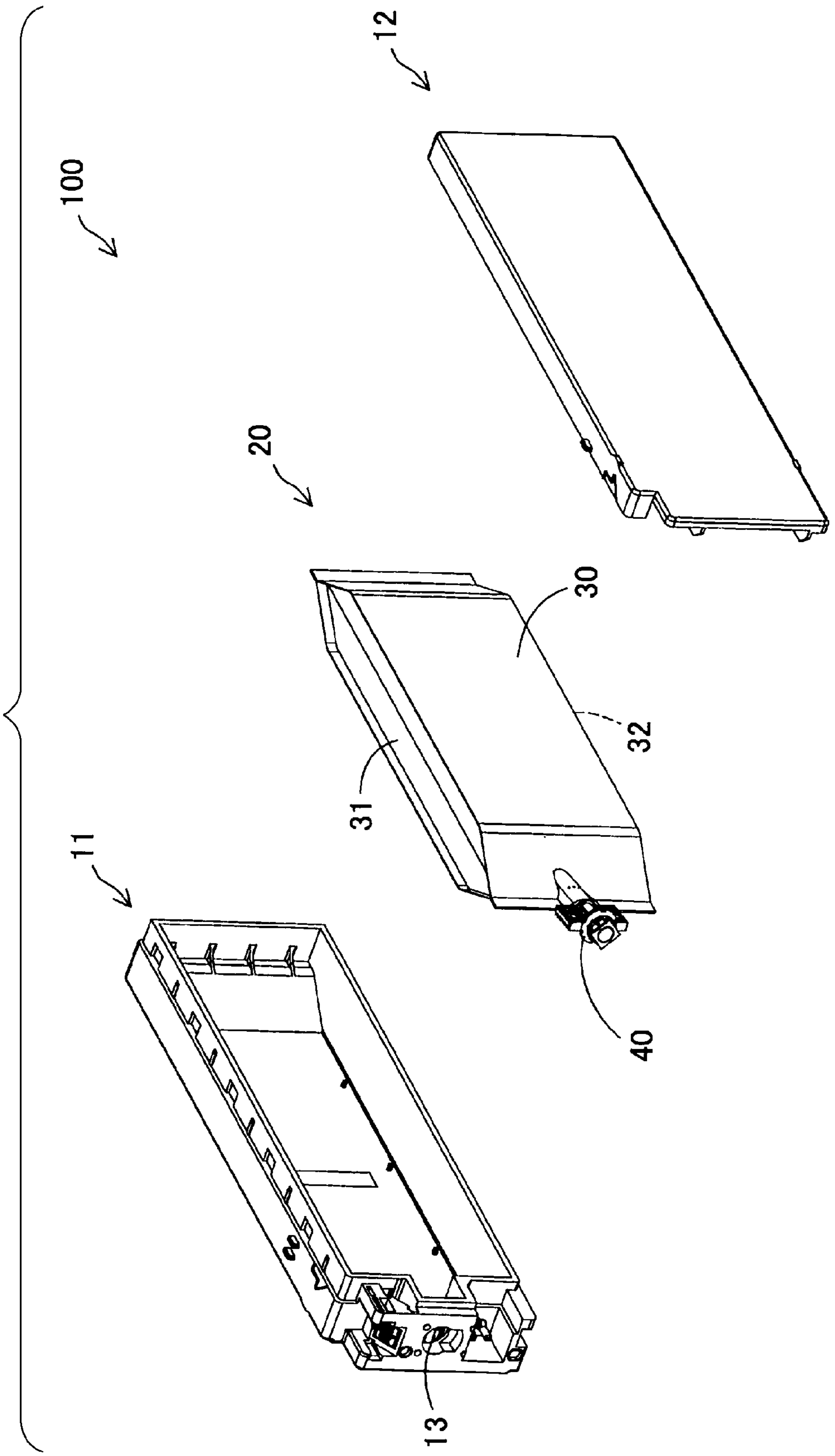
FIG. 2 is an exploded perspective view of the ink container.

FIG. 1 is an external perspective view of an ink container 100, and FIG. 2 is an exploded perspective view of the ink container 100. In the present embodiment, the ink container 100 is a cartridge that is mounted on a liquid consuming device. The ink container 100 includes a case 10 and a liquid accommodating body 20. The case 10 is constituted by a first case 11 and a second case 12, and is formed by combining the first case 11 and the second case 12 together. An opening 13 is provided at one end of the case 10. The liquid accommodating body 20 is housed in the case 10. The liquid consuming device is, for example, an ink jet printer that records an image or the like on a medium by ejecting ink onto the medium.

The liquid accommodating body 20 includes a liquid accommodating portion 30 and a liquid flowing portion 40.

The liquid accommodating portion 30 accommodates liquid therein. In the present embodiment, the liquid accommodating portion 30 is a gusset-type bag having gussets on an upper surface 31 and a lower surface 32 thereof. The liquid accommodating portion 30 is formed of a flexible film. The film forming the liquid accommodating portion 30 is, for example, polyethylene terephthalate or polyethylene. Since the liquid accommodating portion 30 is formed of a flexible film, a shape of the liquid accommodating portion 30 changes depending on a volume of the liquid accommodated in the liquid accommodating portion 30. The liquid accommodating portion 30 accommodates pigment ink or dye ink. The liquid accommodating portion 30 may contain UV ink having a property of curing when irradiated with ultraviolet rays. The shape and material of the liquid accommodating portion 30 are not limited to those described above. For example, the liquid accommodating portion 30 may be a pillow-type bag and may be formed of a non-flexible material.

The liquid flowing portion 40 is a tubular member through which liquid can flow. The liquid flowing portion 40 is coupled to the liquid accommodating portion 30 and is configured to supply liquid to the inside of the liquid accommodating portion 30 and discharge liquid from the inside of the liquid accommodating portion 30. A valve mechanism for opening and closing a liquid flow path in the liquid flowing portion 40 is provided in the liquid flowing portion 40. The liquid accommodating body 20 is accommodated in the case 10 in such a way that liquid can be supplied to and discharged from the liquid accommodating portion 30 through the opening 13 and the liquid flowing portion 40 in a state in which the liquid accommodating body 20 is accommodated in the case 10.

Figure 3:
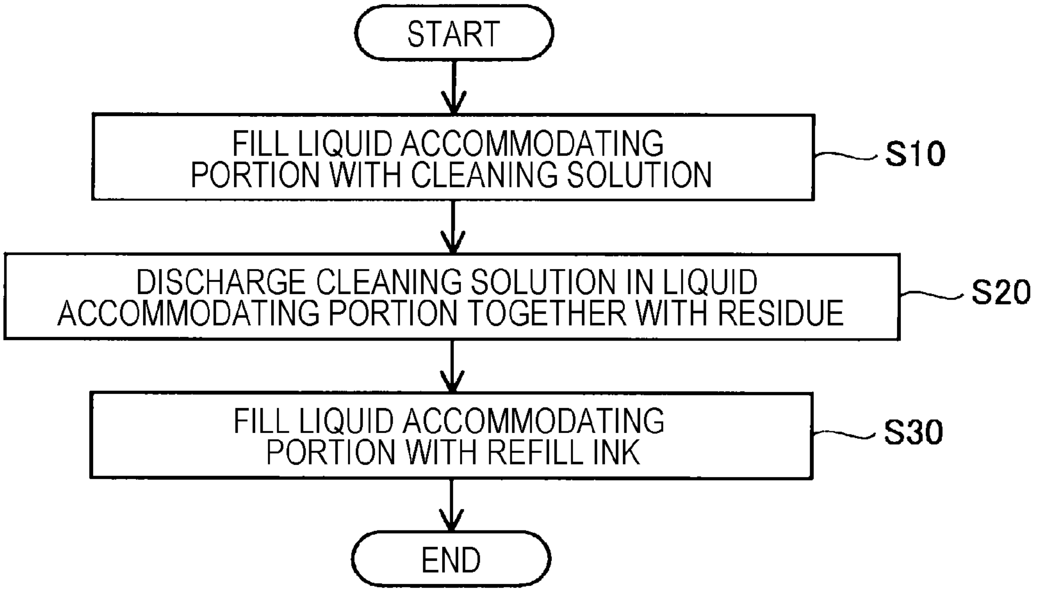
FIG. 3 is a flowchart illustrating a method for manufacturing a refilled ink container.
Figure 4:
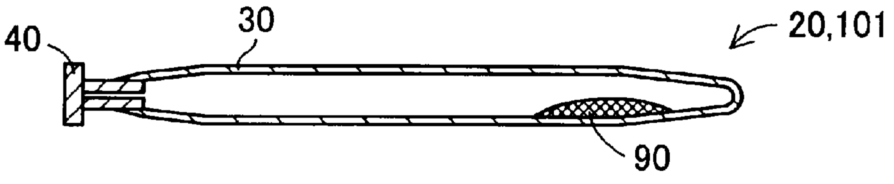
FIG. 4 is an illustration of a used ink container.
Figure 5:
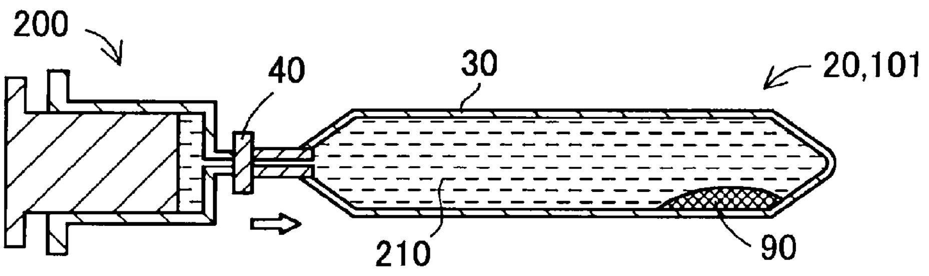
FIG. 5 illustrates a step of the method for manufacturing a refilled ink container.
Figure 6:
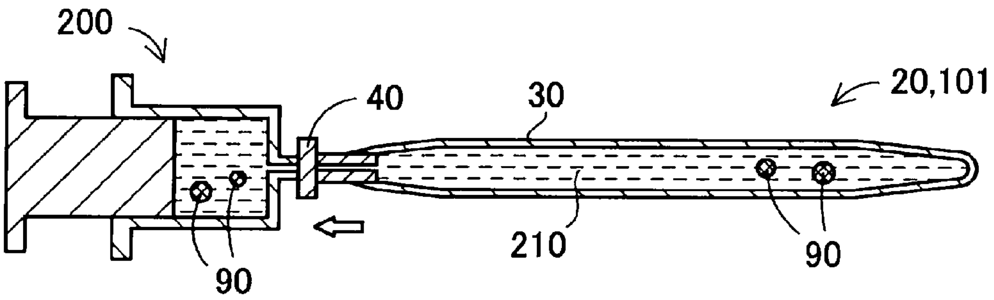
FIG. 6 illustrates a step of the method for manufacturing a refilled ink container.
Figure 7:
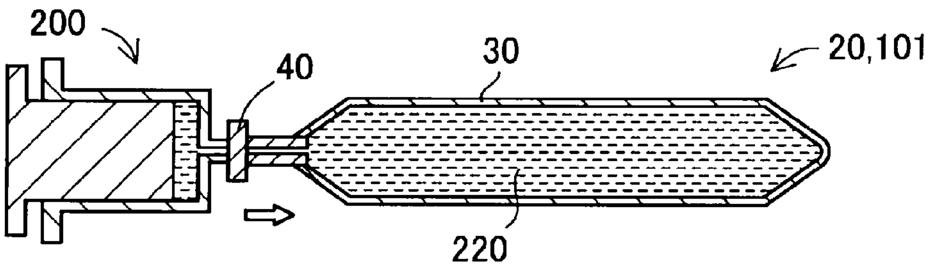
FIG. 7 illustrates a step of the method for manufacturing a refilled ink container.

A method for manufacturing a refilled ink container will be described with reference to FIGS. 3 to 7. FIG. 3 is a flowchart illustrating the method for manufacturing a refilled ink container. FIG. 4 is an illustration of a used ink container 101. FIGS. 5 to 7 illustrate individual steps in FIG. 3. Note that the case 10 is not illustrated in FIGS. 4 to 7.

FIG. 4 illustrates the liquid accommodating body 20 accommodated in the used ink container 101. In the present specification, the term "used ink container" means an ink container 101 in which at least part of ink accommodated in advance in the liquid accommodating portion 30 was consumed by supplying the ink to a liquid consuming device. A residue 90 remains in the liquid accommodating portion 30 of the used ink container 101. The residue 90 is an aggregate of ink remaining in the liquid accommodating portion 30 without being consumed by a liquid consuming device or a colorant contained in the ink accommodated in advance in the liquid accommodating portion 30, the aggregate being formed by vibration of the ink container 101, a temperature change, or the like. Part of the aggregate described above adheres to an inner wall of the liquid accommodating portion 30 when a position of a liquid surface of the ink changes inside the liquid accommodating portion 30 as the ink accommodated in the liquid accommodating portion 30 is consumed. Here, the colorant is a pigment when the ink is pigment ink, and the colorant is a dye when the ink is dye ink.

First, in Step S10 of FIG. 3, a syringe 200 is used to pour a cleaning solution 210 into the liquid accommodating portion 30 through the liquid flowing portion 40 of the used ink container 101 to fill the liquid accommodating portion 30 with the cleaning solution 210 as illustrated in FIG. 5. A posture of the used ink container 101 in Step S10 is a posture in which the liquid flowing portion 40 and the liquid accommodating portion 30 are horizontal. When the cleaning solution 210 is poured into the liquid accommodating portion 30, a tip of the syringe 200 is inserted into the liquid flowing portion 40 to open the internal valve mechanism. Here, the cleaning solution 210 may be the same ink as a refill ink 220 to be used to fill the liquid accommodating portion 30 in Step S30 of FIG. 3, or may be liquid obtained by removing a colorant from the refill ink 220. The posture of the used ink container 101 in Step S10 may also be a posture in which the liquid flowing portion 40 and the liquid accommodating portion 30 are not horizontal.

Next, in Step S20 of FIG. 3, the syringe 200 is used to discharge the cleaning solution 210 in the liquid accommodating portion 30 in Step S10 together with the residue 90 through the liquid flowing portion 40 to the outside of the liquid accommodating portion 30 as illustrated in FIG. 6.

Finally, in Step S30 of FIG. 3, the syringe 200 is used to pour the refill ink 220 into the liquid accommodating portion 30 through the liquid flowing portion 40 to fill the liquid accommodating portion 30 with the refill ink 220 as illustrated in FIG. 7. After the filling of the liquid accommodating portion 30 with the refill ink 220 is completed, the tip of the syringe 200 is pulled out from the liquid flowing portion 40 to close the valve mechanism. The refill ink 220 is the same ink as the ink accommodated in advance in the liquid accommodating portion 30 before the ink container 101 is used. The colorant contained in the refill ink 220 is the same as the colorant contained in the ink accommodated in advance in the liquid accommodating portion 30 before the ink container 101 is used. For example, when a color of the ink accommodated in advance in the liquid accommodating portion 30 of the used ink container 101 is magenta, a color of the refill ink 220 is magenta.

Steps S10 and S20 of FIG. 3 are repeated as many times as necessary to make the quality of the refill ink 220 that filled the liquid accommodating portion 30 in Step S30 equivalent to that of the ink that filled in advance the liquid accommodating portion 30 before the ink container 101 is used. The number of times Steps S10 and S20 are repeated is determined in advance by experiment.

In the method for manufacturing a refilled ink container according to the present embodiment described above, the cleaning solution 210 is poured into the liquid accommodating portion 30 of the used ink container 101 to fill the liquid accommodating portion 30 with the cleaning solution 210, the cleaning solution 210 in the liquid accommodating portion 30 is then discharged together with the residue 90 to the outside of the liquid accommodating portion 30, and the refill ink 220 is finally poured into the liquid accommodating portion 30 to fill the liquid accommodating portion 30 with the refill ink 220. Therefore, the residue 90 remaining in the liquid accommodating portion 30 can be reduced before the used ink container 101 is filled with the refill ink 220. As a result, it is possible to reduce a difference in ink quality after refilling depending on the individual used ink container 101. In addition, it is possible to reduce a possibility of causing problems such as clogging of a filter due to the residue 90 in a liquid consuming device when the refilled ink container 101 is used. Therefore, the quality of the ink accommodated in the ink container 101 refilled with the refill ink 220 can be improved.

Furthermore, according to the present embodiment, in Step S20 of FIG. 3, the cleaning solution 210 in the liquid accommodating portion 30 in Step S10 is collected into the syringe 200 together with the residue 90. When the cleaning solution 210 collected into the syringe 200 does not contain the residue 90, the cleaning solution 210 can be reused. When the cleaning solution 210 collected into the syringe 200 contains the residue 90, the collected cleaning solution 210 can be filtered to remove the residue 90, and the filtered cleaning solution 210 can be reused. In the above description, when the cleaning solution 210 is the same ink as the refill ink 220, the cleaning solution 210 that does not contain the residue 90 or the cleaning solution 210 from which the residue 90 was removed can be reused as the refill ink 220.

B. Second Embodiment

Figure 8:
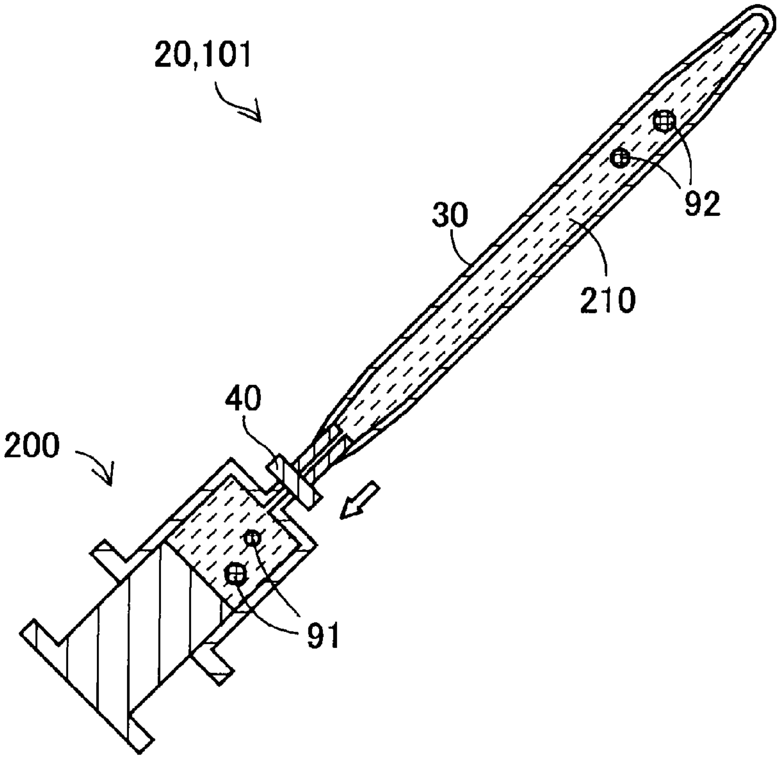
FIG. 8 illustrates a posture of the used ink container in a second embodiment.
Figure 9:
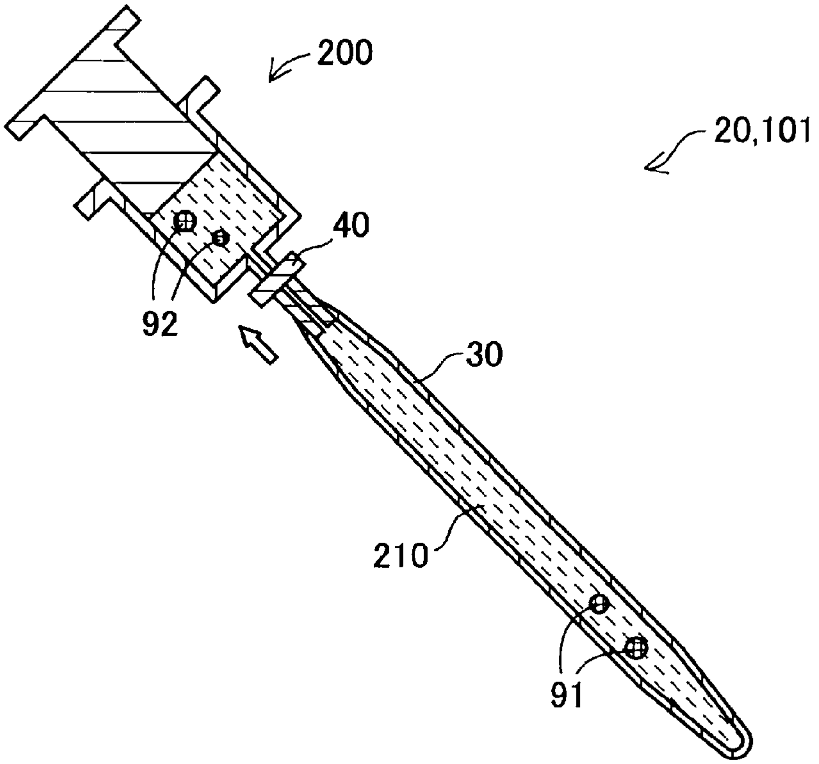
FIG. 9 illustrates a posture of the used ink container in the second embodiment.

FIGS. 8 and 9 illustrate a posture of the used ink container 101 in a second embodiment. According to the second embodiment, the posture of the ink container 101 is changed in such a way that a positional relationship between the liquid flowing portion 40 and the liquid accommodating portion 30 in a vertical direction is changed from the positional relationship in Step S10 before or while the cleaning solution 210 in the liquid accommodating portion 30 of the used ink container 101 is discharged together with the residue 90 through the liquid flowing portion 40 in Step S20 of FIG. 3. FIG. 8 illustrates that the cleaning solution 210 in the liquid accommodating portion 30 is discharged through the liquid flowing portion 40 in a state in which the posture of the used ink container 101 is changed in such a way that the liquid flowing portion 40 is positioned below the liquid accommodating portion 30 in the vertical direction. FIG. 9 illustrates that the cleaning solution 210 in the liquid accommodating portion 30 is discharged through the liquid flowing portion 40 in a state in which the posture of the used ink container 101 is changed in such a way that the liquid flowing portion 40 is positioned above the liquid accommodating portion 30 in the vertical direction.

When the posture of the used ink container 101 in Step S10 is a posture in which the liquid flowing portion 40 is positioned above the liquid accommodating portion 30 in the vertical direction, the posture of the used ink container 101 in Step S20 may be a posture in which the liquid flowing portion 40 is positioned below the liquid accommodating portion 30 in the vertical direction. In contrast, when the posture of the used ink container 101 in Step S10 is a posture in which the liquid flowing portion 40 is positioned below the liquid accommodating portion 30 in the vertical direction, the posture of the used ink container 101 in Step S20 may be a posture in which the liquid flowing portion 40 is positioned above the liquid accommodating portion 30 in the vertical direction.

The residue 90 may include a residue that floats and a residue that sinks in the cleaning solution 210 when the cleaning solution 210 is poured into the liquid accommodating portion 30, depending on a specific gravity with respect to the cleaning solution 210. When the liquid flowing portion 40 is positioned below the liquid accommodating portion 30 in the vertical direction, it is easy to discharge a residue 91 having a high specific gravity with respect to the cleaning solution 210 when discharging the cleaning solution 210 accommodated in the liquid accommodating portion 30 through the liquid flowing portion 40 together with the residue 90. When the liquid flowing portion 40 is positioned above the liquid accommodating portion 30 in the vertical direction, it is easy to discharge a residue 92 having a low specific gravity with respect to the cleaning solution 210 when discharging the cleaning solution 210 accommodated in the liquid accommodating portion 30 through the liquid flowing portion 40 together with the residue 90.

According to the second embodiment described above, when the cleaning solution 210 is discharged from the liquid accommodating portion 30 together with the residue 90 in a posture in which the liquid flowing portion 40 is positioned below the liquid accommodating portion 30 in the vertical direction, the residue 91 having a higher specific gravity with respect to the cleaning solution 210 can be easily discharged. When the cleaning solution 210 is discharged from the liquid accommodating portion 30 together with the residue 90 in a posture in which the liquid flowing portion 40 is positioned above the liquid accommodating portion 30 in the vertical direction, the residue 92 having a low specific gravity with respect to the cleaning solution 210 can be easily discharged. Therefore, the efficiency in discharging the residue 90 from the liquid accommodating portion 30 of the used ink container 101 can be improved.

Furthermore, when the residue 90 includes both the residue 91 having a high specific gravity with respect to the cleaning solution 210 and the residue 92 having a low specific gravity with respect to the cleaning solution 210, the used ink container 101 may be tilted in both the posture in which the liquid flowing portion 40 is positioned below the liquid accommodating portion 30 in the vertical direction and the posture in which the liquid flowing portion 40 is positioned above the liquid accommodating portion 30 in the vertical direction while the cleaning solution 210 is discharged from the liquid accommodating portion 30 in Step S20, so that both the residue 91 having a high specific gravity with respect to the cleaning solution 210 and the residue 92 having a low specific gravity with respect to the cleaning solution 210 can be easily discharged.

C. Third Embodiment

Figure 10:
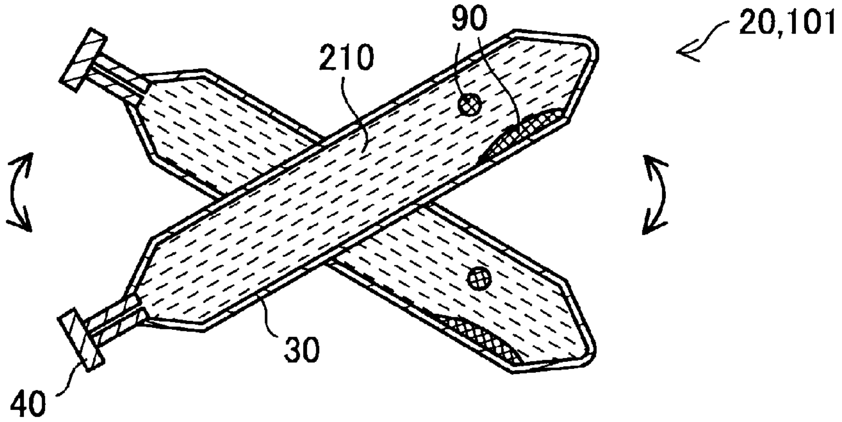
FIG. 10 illustrates a posture of the used ink container in a third embodiment.

FIG. 10 illustrates a posture of the used ink container 101 in a third embodiment. According to the third embodiment, the ink container 101 is vibrated after the liquid accommodating portion 30 is filled with the cleaning solution 210 through the liquid flowing portion 40 of the used ink container 101 in Step S10 of FIG. 3. In FIG. 10, the used ink container 101 is vibrated in such a way that the position of the liquid flowing portion 40 with respect to the liquid accommodating portion 30 in the vertical direction is changed. Note that a direction in which the used ink container 101 is vibrated is not limited thereto. For example, the used ink container 101 may be vibrated in a horizontal plane. By doing so, the residue 90 adhering to the inner wall of the liquid accommodating portion 30 can be easily peeled off. Therefore, a larger amount of residue 90 can be removed from the liquid accommodating portion 30. Further, the efficiency in discharging the residue 90 from the liquid accommodating portion 30 of the used ink container 101 can be improved.

D. Other Embodiments (D-1) In the above embodiments, the ink container 100 includes the case 10. In contrast, the ink container 100 does not have to include the case 10. When the ink container 100 does not include the case 10, the ink container 100 may be formed of a flexible material or may be formed of an inflexible material. Further, the ink container 100 may have any shape as long as the ink container 100 can be mounted on a liquid consuming device. For example, the ink container 100 may have a bag shape or a rectangular parallelepiped shape.

(D-2) In the above embodiments, the ink container 100 is a cartridge that is mounted on a liquid consuming device. In contrast, the ink container 100 does not have to be a cartridge mounted on a liquid consuming device, and may be an ink bottle, for a liquid consuming device including an ink tank that accommodates ink, that accommodates ink for replenishing the ink tank.

(D-3) In the above embodiments, the syringe 200 is used to supply and discharge the cleaning solution 210 or the refill ink 220 to and from the liquid accommodating portion 30 of the used ink container 101. In contrast, instead of the syringe 200, various pumps such as a roller pump may be used to supply and discharge the cleaning solution 210 or the refill ink 220 to and from the liquid accommodating portion 30 of the used ink container 101.

E. Other Forms

The present disclosure is not limited to the embodiments described above, and can be implemented in various forms without departing from the scope of the present disclosure. For example, the present disclosure can also be implemented in the following forms. The technical features in the above embodiments corresponding to the technical features in each form described below can be replaced or combined as appropriate to achieve some or all of the objects of the present disclosure or to achieve some or all of the advantages of the present disclosure. Further, when the technical features are not described as essential in the present specification, the technical features can be deleted as appropriate.

(1) According to one form of the present disclosure, a method for manufacturing a refilled ink container is provided. The method for manufacturing a refilled ink container includes: a first step of pouring a cleaning solution into a used ink container including a liquid flowing portion and a liquid accommodating portion through the liquid flowing portion to fill the liquid accommodating portion with the cleaning solution, the liquid flowing portion being configured to supply and discharge liquid; a second step of discharging the cleaning solution in the liquid accommodating portion through the liquid flowing portion together with a residue remaining in the liquid accommodating portion; and a third step of, after the second step, pouring refill ink into the ink container through the liquid flowing portion to fill the liquid accommodating portion with the refill ink.

According to this form, the liquid accommodating portion of the used ink container is filled with the cleaning solution, the cleaning solution in the liquid accommodating portion is discharged together with the residue, and the liquid accommodating portion is then filled with the refill ink. Therefore, it is possible to reduce the residue remaining in the liquid accommodating portion before filling the used ink container with the refill ink. Therefore, it is possible to reduce a difference in ink quality after refilling depending on the individual ink container. In addition, it is possible to reduce a possibility of causing problems such as clogging of a filter due to a residue in a liquid consuming device when the refilled ink container is used. Therefore, it is possible to improve the quality of ink accommodated in an ink container obtained by filling a used ink container with refill ink.

(2) In the second step in the above form, a posture of the ink container may be changed in such a way that a positional relationship between the liquid flowing portion and the liquid accommodating portion in a vertical direction is changed before or while the cleaning solution is discharged together with the residue remaining in the liquid accommodating portion through the liquid flowing portion. According to this form, a residue having a specific gravity different from that of the cleaning solution can be easily discharged from the liquid accommodating portion, so that the efficiency in discharging the residue from the used ink container can be improved.

(3) In the first step in the above forms, the ink container may be vibrated after the liquid accommodating portion is filled with the cleaning solution. According to this form, the residue adhering to the inner wall of the liquid accommodating portion can be easily peeled off, and the efficiency in discharging the residue from the used ink container can thus be improved.

What is claimed is:

1. A method for manufacturing a refilled ink container, the method comprising:

a first step of pouring a cleaning solution into a used ink container including a liquid flowing portion and a liquid accommodating portion through the liquid flowing portion to fill the liquid accommodating portion with the cleaning solution, the liquid flowing portion being configured to supply and discharge liquid;

a second step of discharging the cleaning solution in the liquid accommodating portion through the liquid flowing portion together with a residue remaining in the liquid accommodating portion; and a third step of, after the second step, pouring refill ink into the ink container through the liquid flowing portion to fill the liquid accommodating portion with the refill ink, wherein in the first step, the ink container is vibrated after the liquid accommodating portion is filled with the cleaning solution.

2. The method for manufacturing a refilled ink container according to claim 1, wherein in the second step, a posture of the ink container is changed in such a way that a positional relationship between the liquid flowing portion and the liquid accommodating portion in a vertical direction is changed before or while the cleaning solution is discharged together with the residue remaining in the liquid accommodating portion through the liquid flowing portion.

* * * * *